(12) United States Patent
Blatchley et al.

(10) Patent No.: US 9,826,094 B2
(45) Date of Patent: *Nov. 21, 2017

(54) TRANSMISSION OF EMERGENCY DATA DURING AN EMERGENCY

(71) Applicant: International Business Machines Corporation, Armonk, NY (US)

(72) Inventors: Robert D. Blatchley, Longmont, CO (US); Jurij M. Deputat, Longmont, CO (US); Donald P. Taylor, III, Longmont, CO (US); Stephen E. Zimmermann, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,125

(22) Filed: Feb. 13, 2017

(65) Prior Publication Data

US 2017/0155765 A1    Jun. 1, 2017

Related U.S. Application Data

(63) Continuation of application No. 12/208,326, filed on Sep. 10, 2008, now Pat. No. 9,614,975.

(51) Int. Cl.
*H04M 11/04* (2006.01)
*H04M 3/51* (2006.01)
(Continued)

(52) U.S. Cl.
CPC ....... *H04M 3/5116* (2013.01); *H04L 65/4023* (2013.01); *H04M 7/0075* (2013.01); *H04M 2242/04* (2013.01)

(58) Field of Classification Search
CPC ............... H04M 3/5116; H04M 11/04; H04M 2242/04; H04M 7/006
(Continued)

(56) References Cited

U.S. PATENT DOCUMENTS

| 5,309,146 A | 5/1994 | Kenet |
| 6,104,783 A | 8/2000 | DeFino |

(Continued)

OTHER PUBLICATIONS

Jiang, X. et al., "Ubiquitous Computing for Firefighters: Field Studies and Prototypes of Large Displays for Incident Command", CHI 2004, Apr. 24-29, 2004, Vienna, Austria.
(Continued)

*Primary Examiner* — Van D Huynh
(74) *Attorney, Agent, or Firm* — Schmeiser, Olsen & Watts, LLP; Michael Petrocelli

(57) ABSTRACT

A method, and an associated computer program product and computer system. One or more processors of a first computer located in a building monitor outgoing calls from a telephone in the building. The monitoring identifies an outgoing call dialed from the telephone. The one or more processors determine that the identified outgoing call is a telephone number of an emergency response center. In response to determining that the outgoing call is the telephone number of the emergency response center, the one or more processors transmit, via a communications network, emergency data having relevance to an emergency at the building to a second computer of the emergency response center and to emergency responders available to respond to the emergency at the building. The emergency responders are associated with the emergency response center. The emergency data transmitted to each emergency responder is specific to each emergency responder.

18 Claims, 7 Drawing Sheets

(51) Int. Cl.
*H04M 7/00* (2006.01)
*H04L 29/06* (2006.01)

(58) Field of Classification Search
USPC ................................................ 379/37, 45
See application file for complete search history.

(56) References Cited

U.S. PATENT DOCUMENTS

| | | | |
|---|---|---|---|
| 6,917,288 B2 | 7/2005 | Kimmel et al. | |
| 6,985,717 B1* | 1/2006 | Yoshioka | B60Q 1/52 455/404.1 |
| 2003/0012344 A1* | 1/2003 | Agarwal | H04M 11/04 379/37 |
| 2003/0028536 A1 | 2/2003 | Singh et al. | |
| 2003/0125998 A1 | 7/2003 | McKenney et al. | |
| 2003/0135324 A1 | 7/2003 | Navab | |
| 2005/0096043 A1 | 5/2005 | Haberman et al. | |
| 2005/0190053 A1 | 9/2005 | Dione | |
| 2005/0243973 A1* | 11/2005 | Laliberte | H04M 11/04 379/37 |
| 2005/0265326 A1 | 12/2005 | Laliberte | |
| 2006/0115057 A1 | 6/2006 | Laliberte | |
| 2006/0120517 A1* | 6/2006 | Moon | H04M 11/04 379/45 |
| 2006/0203971 A1* | 9/2006 | Anderson | H04W 4/22 379/45 |
| 2007/0257937 A1 | 11/2007 | Rye et al. | |
| 2008/0122609 A1 | 5/2008 | Mannisto et al. | |
| 2008/0152112 A1 | 6/2008 | Gayde et al. | |
| 2008/0178251 A1 | 7/2008 | Shin | |
| 2010/0061526 A1 | 3/2010 | Blatchley et al. | |

OTHER PUBLICATIONS

Borriello, G. et al., "Wireless Acoustic Location with Room-Level Resolution using Ultrasound", pp. 191-203, 2004/2005.
Office Action (dated Oct. 11, 2011) for U.S. Appl. No. 12/208,326, filed 9/1012008, Attorney Docket No. END920080186US1.
"Radio-frequency identification", wikipedia, http:I/web.archive. org/web/20071116150323/http:I/en.wikipedia.org/wiki/ RFID#Transportation_payments (Retrieved at archive.org on Dec. 22, 2011).
"Growers, Grocers, Get Into Plastic Pallet", RFID Journal, http:// web.archive.org/web/20071219190121/http:I/www.rfidjournal. com/∩top (Retrieved at archive.org on Dec. 22, 2011).
"Company Aims to Turn Readers to Radar" RFID Journal, Oct. 28, 2005, http://www.rfidjournal.com/article/view/1959/1/1 (Retrieved at archive.org on Dec. 22, 2011).
Elamin, Ahmed; "Radar Reader Spots RFID tag Location at a Distance", Oct. 25, 2005, http://www.foodproductiondaily.com/ news/ng.asp?id=63448-rfid-tag-supply-chain.
Trolley Scan(Pty) Ltd., RFID-radar(tm) RFID-radar Newsletter, Newsletter No. 18, http://web.archive.org/web/20070923031222/ http://www.rfid-radar.com/newslett.html (Retrieved at archive.org on Dec. 22, 2011).
'Reader System Identifies and Tracks Multi RFID tags. Inventors RFID-Radar, Products News Network, Nov. 29, 2005, http:// findarticles.com/p/articles/mi_mOPIL/is_2005_Nov_29/ai_ n15881688.
Amendment (dated Dec. 22, 2011) for U.S. Appl. No. 12/208,326, filed Sep. 10, 2008.
Final Office Action (dated Apr. 10, 2012) for U.S. Appl. No. 12/208,326, filed Sep. 10, 2008.
Notice of Appeal (dated Jun. 29, 2012) for U.S. Appl. No. 12/208,326, filed Sep. 10, 2008.
Appeal Brief (dated Jul. 2, 2012) for U.S. Appl. No. 12/208,326, filed Sep. 10, 2008.
Examiner's Answer to Appeal Brief (dated Nov. 7, 2012) for U.S. Appl. No. 12/208,326, filed Sep. 10, 2008.
Reply Brief (dated Jan. 4, 2013) for U.S. Appl. No. 12/208,326, filed Sep. 10, 2008.
Decision on Appeal (dated Aug. 5, 2015) for U.S. Appl. No. 12/208,326, filed Sep. 10, 2008.
RCE with PA (Oct. 5, 2015) for U.S. Appl. No. 12/208,326, filed Sep. 10, 2008.
Office Action (dated Jan. 13, 2016) for U.S. Appl. No. 12/208,326, filed Sep. 10, 2008.
Amendment (dated Apr. 4, 2016) for U.S. Appl. No. 12/208,326, filed Sep. 10, 2008.
Final Office Action (dated Jun. 30, 2016) for U.S. Appl. No. 12/208,326, filed Sep. 10, 2008.
Final Amendment (dated Aug. 30, 2016) for U.S. Appl. No. 12/208,326, filed Sep. 10, 2008.
Advisory Action (dated Sep. 21, 2016) for U.S. Appl. No. 12/208,326, filed Sep. 10, 2008.
RCE with PA (Oct. 28, 2016) for U.S. Appl. No. 12/208,326, filed Sep. 10, 2008.
Notice of Allowance (dated Nov. 23, 2016) for U.S. Appl. No. 12/208,326, filed Sep. 10, 2008.

* cited by examiner

TRANSMISSION OF EMERGENCY DATA DURING AN EMERGENCY

This application is a continuation application claiming priority to Ser. No. 12/208,326, filed Sep. 10, 2008, now U.S. Pat. No. 9,614,975, issued Apr. 4, 2017.

FIELD OF THE INVENTION

The present invention relates to computer systems and software, and more specifically to an automated technique for triggering the automatic transmission and communication of relevant emergency data and/or information pertaining to the occurrence of an emergency.

BACKGROUND OF THE INVENTION

Today, in the event of an emergency at a home or business, firefighters, police and other emergency personnel arrive with little or no information about the nature of the emergency. In the event of an emergency, seconds count. As a result, valuable time may be spent trying to gather information or trying to make an educated guess as to information needed to carry out the emergency operation, instead of carrying out any rescue operation, etc. As such, there is a need to provide a solution for effectively providing emergency information to one or more persons during an emergency.

SUMMARY OF THE INVENTION

The present invention resides in a system, method and program product for triggering the automatic distribution of emergency data and information during the occurrence of an emergency. The method includes loading an emergency planning and coordination program onto a computer system, the system being connected to a Voice over IP communications network and inputting emergency data for a location into the program. The method includes storing the emergency data inputted to a database coupled to the computer system, accessing, responsive to a communication received regarding an occurrence of the emergency situation at the location, the emergency data for the location stored on the database coupled to the computer system in order to confirm whether or not the communication received corresponds to a preset piece of emergency data stored in the database, and automatically transmitting, responsive to confirming that the communication received corresponds to the preset piece of emergency data stored in the database, pertinent data from the emergency data accessed from the database to one or more respective devices used by respective emergency responders available to respond to the emergency situation at the location, wherein the pertinent data transmitted to the one or more respective devices used by the emergency responders available facilitates handling of the emergency situation at the location.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
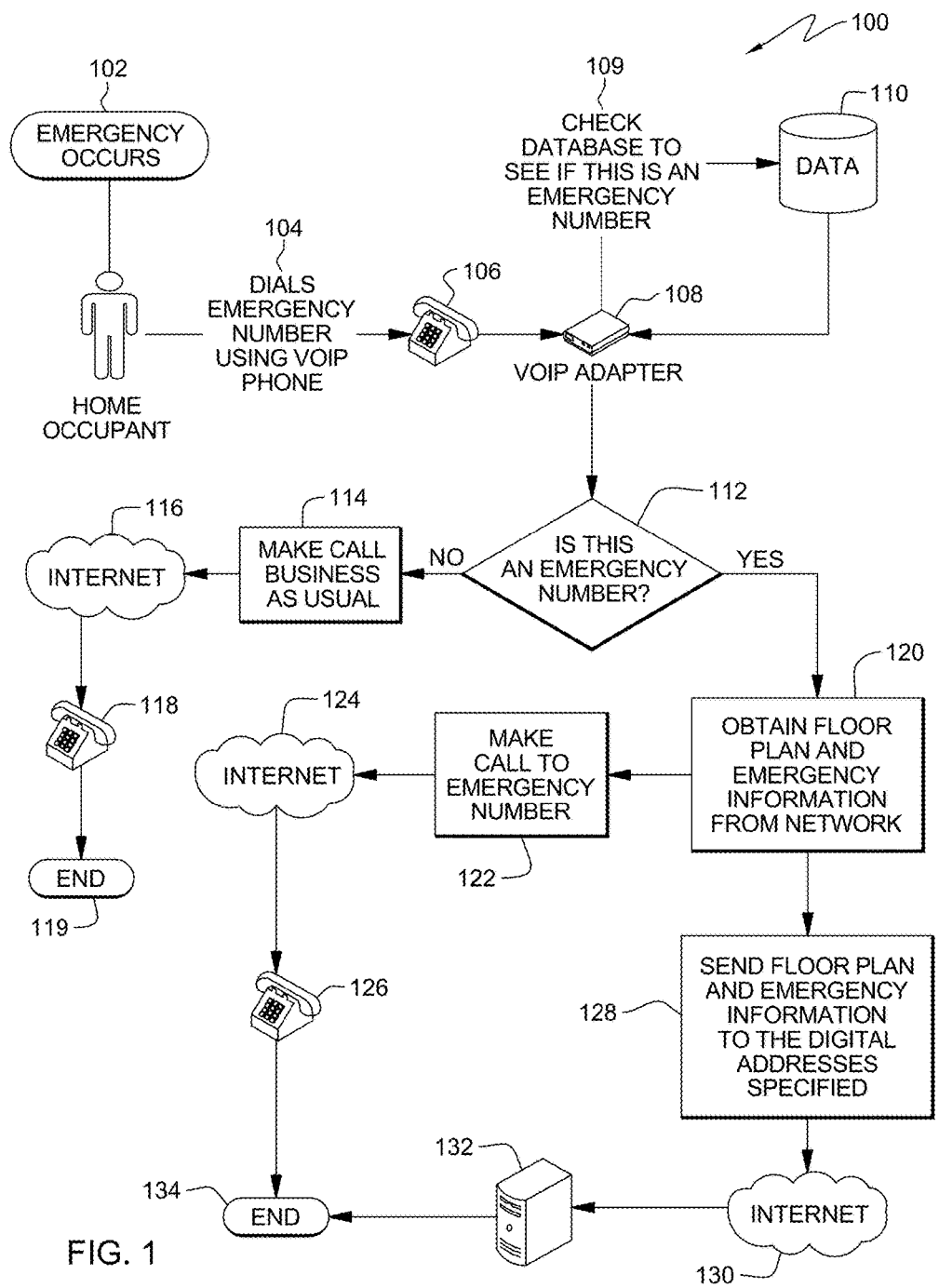
FIG. 1 is a schematic diagram illustrating one embodiment of a system for performing a method of triggering and automatically transmitting and communicating relevant information pertaining to the occurrence of an emergency, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 2:
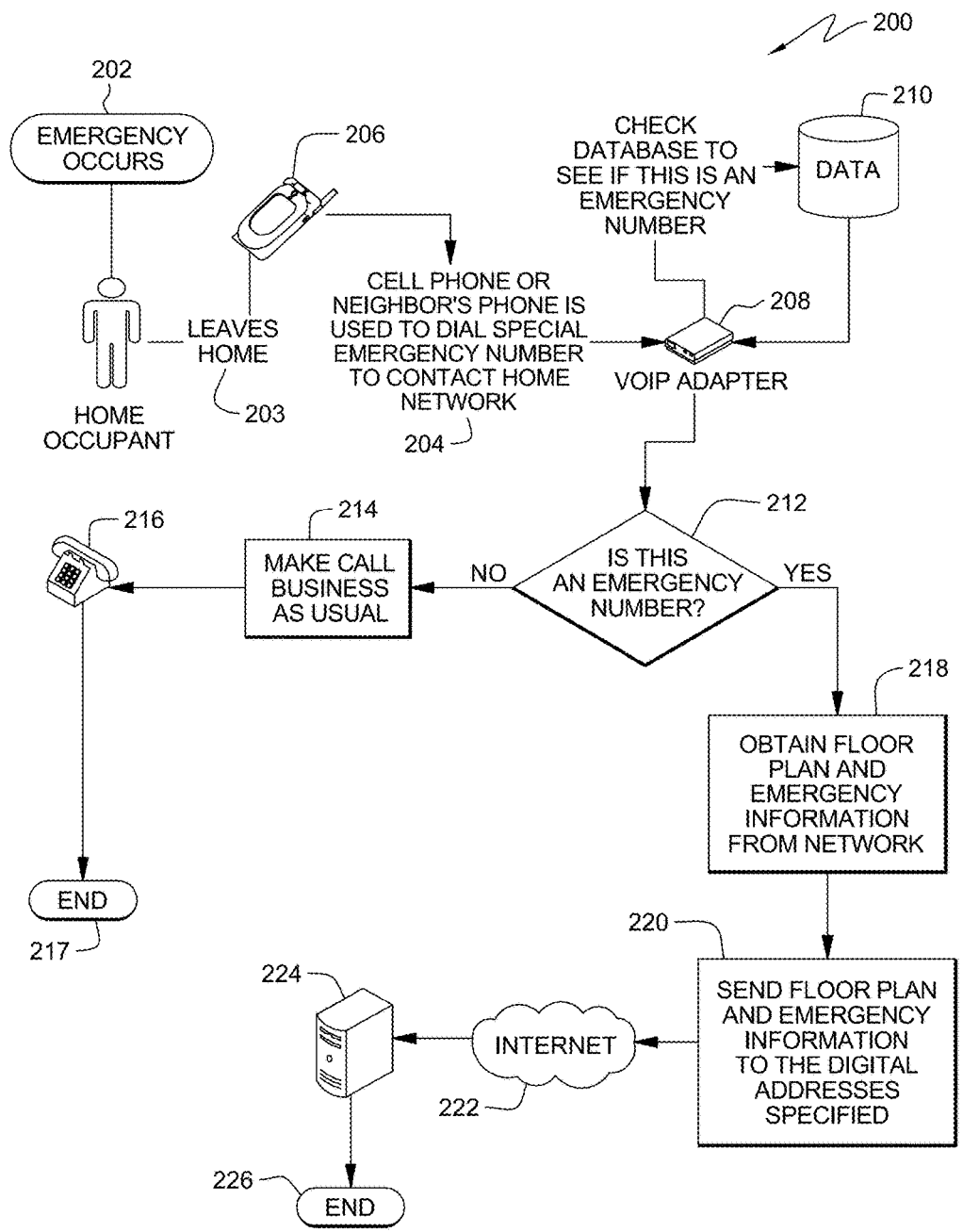
FIG. 2 is a schematic diagram illustrating another embodiment of a system for performing a method of triggering and automatically transmitting and communicating relevant information pertaining to the occurrence of an emergency, in accordance with an embodiment of the present invention.

Reference is now made to FIGS. 1 and 2, reference numeral 100 and 200, respectively, which schematically illustrate different embodiments of a system for performing a method of triggering the automatic transmission and communication of relevant information pertaining to the occurrence of an emergency at the time of the emergency, in accordance with an embodiment of the present invention. Turning to FIG. 1, FIG. 1 depicts a system 100 for triggering the automatic transmission and communication of relevant emergency information pertaining to the occurrence of an emergency at a location, for instance, a home, where the home owner or occupant triggers communication of the relevant emergency information pertaining to the occurrence of the emergency from within the location, namely, the home itself. It is understood by one skilled in the art that the invention may be used in a home, an office or a business, such as, a hotel, etc. In FIGS. 1 and 2, the emergency location described is that of an emergency occurring at a home, thus, the remainder of the discussion in FIGS. 1 and 2 will be with reference to a home and the home owner or occupant of the home. In particular, the home owner or occupant has installed an emergency planning and coordination tool or program on a home computer system that is connected to a communications network, which in an embodiment, is a VoIP (Voice over Internet Protocol) network. Further, the owner of the computer system has configured the emergency planning and coordination tool or program by entering and inputting emergency information and/or data, such as, emergency phone numbers for 911, the police department, the fire department, EMS (Emergency Medical Services), digital or electronic addresses of one or more parties to be contacted in the case of an emergency, etc., which, in an embodiment, is stored in a local database coupled to the owner's computer system. In an embodiment, the emergency planning and coordination program or tool enables a home owner to create a floor plan for the home that can be used during an emergency. The emergency planning and coordination tool or program is configured to trigger, transmit and communicate relevant emergency information stored in a local database, including emergency information, such as, a created floor plan and any other emergency information pertaining to the occurrence of an emergency at the home, which is discussed further herein below with respect to FIGS. 4 and 5. As shown in FIG. 1, when an emergency occurs (reference numeral 102) at a location, for instance, a house, the occupant or home owner dials an emergency number (reference numeral 104) provided in the emergency planning and coordination tool. In an embodiment, the home owner dials the emergency number from within the location, the house in this case, either using a VoIP phone (reference numeral 106) that is connected to a Voice over IP (VoIP) communications network or uses a regular phone (reference numeral 106) that is coupled to a VoIP adapter (reference numeral 108) for communicating with the Voice over IP (VoIP) communications network. The emergency planning and coordination tool installed on the home computer system checks (reference numeral 109) a local database (reference numeral 110) coupled to the home computer system to determine (reference numeral 112) whether or not the number dialed by the home owner is an emergency number stored within the local database. If the emergency planning and coordination tool or program determines in step 112 that the emergency number dialed is not an emergency number listed or stored in the local database 110, then the emergency planning and coordination tool makes or connects the call made (reference numeral 114) in a "business as usual" fashion, that is, without triggering transmission of the emergency data and/or information stored on the computer system. The home owner's voice is converted into a digital signal that is transmitted over the Internet (reference numeral 116) to a destination phone (reference numeral 118), ending the process at 119. It is understood that if the destination phone 118 is a regular phone, then the digital signal is converted to a regular telephone signal before it is transmitted to the destination phone, reference numeral 118. Going back to step 112, if the emergency planning and coordination tool or program determines that the emergency number dialed is an emergency number listed or stored in the local database 110, then the emergency planning and coordination tool obtains (reference numeral 120) the relevant emergency information, including any floor plans, created and stored in the home owner's computer system and sends the relevant emergency information to one or more digital or electronic addresses specified by the owner and makes or connects the call to the emergency number dialed (reference numeral 122). The home owner's voice is converted into a digital signal that is transmitted over the Internet (reference numeral 124) to a destination phone (reference numeral 126) or device, such as, an emergency service provider, ending the process at 134. Further, the emergency planning and coordination tool sends or transmits over the Internet (reference numeral 130) emergency information and/or data (reference numeral 128) obtained or retrieved from the database 110 coupled to the home computer system. The emergency information and/or data is transmitted over the Internet (reference numeral 130) to another computer system 132, for instance, a computer system owned by an emergency service provider who handles the emergency, ending the process at 134.

Turning to FIG. 2, FIG. 2 depicts another system 200 for performing a method of triggering the automatic transmission and communication of relevant emergency information pertaining to the occurrence of an emergency at a location, for instance, a home, where the home owner or occupant triggers communication of the relevant emergency information pertaining to the occurrence of the emergency from outside the location of the emergency, namely, from outside the home itself. As shown in FIG. 2, when an emergency occurs (reference numeral 202) at a location, for instance, a house, the occupant or home owner may have to leave the location of the emergency (reference numeral 203), in this case, a house, in order to trigger the automatic transmission and communication of the emergency data and/or relevant emergency information. In particular, the home owner or occupant may use a personal cell phone (reference numeral 206) to dial a special emergency number (reference numeral 204) in order to connect to the home computer system for retrieving and automatically transmitting relevant information that is stored on the local database 210 of the home computer system. Similarly, the home owner or occupant may use a friend's or neighbor's phone or cell phone to dial the special emergency number for connecting to the home computer system for retrieving and automatically sending all relevant information that is stored on the local database 210 of the home computer system to an emergency service provider dialed. In an embodiment, the special number called or dialed from the cell phone or neighbor's phone is routed via a VoIP adapter (reference numeral 208) connected to the home computer system using the Voice over IP (VoIP) communications network. Upon connection to the home computer system, the emergency planning and coordination tool installed on the home computer system checks (reference numeral 209) a local database (reference numeral 210) coupled to the home computer system to determine (reference numeral 212) whether or not the number dialed by the home owner is a special emergency number stored within the local database. If the emergency planning and coordination tool or program determines in step 212 that the special emergency number dialed is not an emergency number listed or stored in the local database 210, that is, the emergency number is not an emergency number, then the emergency planning and coordination tool receives the call (reference numeral 214) connects the call received to the device corresponding to the regular phone number dialed (reference numeral 216) in a "business as usual" fashion, that is, without triggering transmission of the emergency data and/or information stored in the computer system, ending the process. Going back to step 212, if the emergency planning and coordination tool or program determines that the emergency number dialed is an emergency number listed or stored in the local database 210, then the emergency planning and coordination tool obtains (reference numeral 218) the relevant emergency information or data, including a floor plan, stored in the home owner's computer system and automatically sends the relevant emergency information to one or more digital or electronic addresses specified by the owner (reference numeral 220). The relevant emergency information is transmitted over the Internet (reference numeral 222) to a destination device (reference numeral 224) or device, such as, a computer system of an emergency service provider, ending the process at 226. In an embodiment, the special number dialed by a home owner could be the home owner's regular phone number, such that, when the the home owner's voice mail system picks up, in an embodiment, the home owner may be prompted to enter a special code to connect the call to the appropriate emergency service provider and to send the relevant emergency information from the home owner's database to the emergency service provider. Alternatively, the special number could be a special telephone number that is only used in emergency situations, such that, when a home owner dials the special telephone number, the call is connected to the home owner's VoIP network and, upon verification, the computer system automatically sends the emergency data to the appropriate emergency service provider. For example, if the home owner's house is on fire, the home owner may run outside the house with or without a cell phone. If the home owner has a cell phone with him or her, the home owner uses the cell phone to call a special emergency number that is only used in emergencies or may call the home phone number on the cell phone. Similarly, if the home owner does not have a cell phone, the home owner may use any other phone outside the house to make a call to the special emergency number or to the home phone number. Further, once the home owner is connected to the home's VoIP network, the home owner may be prompted to enter a series of keys to further specify what the home owner wants the computer system to do. For instance, the network may prompt the home owner to "press 1 for the fire department" or to "press 2 for the police department" or to "press 3 for emergency medical services", etc. Given that the home owner's house is on fire, the home owner presses or enters 1 and the computer system connected to the VoIP network understands that the home owner wishes to be connected to the fire department and, thus, connects the call received from either the home owner's cell phone or another phone being used and, further, the computer system sends all relevant data pertaining to the fire emergency to the fire department.

Accordingly, the emergency planning and coordination program or tool that is used to create the floor plan, enter emergency information, enter emergency electronic addresses, and telephone numbers can also be used to configure when and what information should be sent to the emergency services personnel. For example, if 911 is called, the homeowner may wish to pre-configure the software to send all emergency information. On the other hand, if for example, the number for the police department is called, the homeowner may only want floor plan information to be sent. Although, while the invention is described in terms of emergency service providers as the recipients of this emergency data and/or information, it is understood that the home or business owner may want the emergency data and/or information sent to neighbors or family members when a call is made to an emergency number. For example, if a home owner calls 911, the home owner's emergency data and/or information is sent to 911 and to other people specified, such as, various family members, neighbors, etc. In an embodiment, the user can configure the emergency planning and coordination program or tool to specify multiple digital or electronic addresses inputted into the computer system, such that, the emergency data and/or information is sent to the specified addresses in case of an emergency. Alternatively, or in conjunction, an automated informational voice message could be sent to, for instance, family members. For example, a home or business owner can configure the emergency planning and coordination program or tool in such a manner that if the home or business owner calls 911, the emergency data and/or information inputted into the system is sent to one or more emergency services providers and, in addition, an informational voice message is sent to the telephone numbers listed for various family members, alerting them of the emergency. The informational voice message may be in a computer voice or the home owner's own recorded voice. Further, the emergency data and/or information transmitted to the emergency service provider's computer system may be forwarded by the emergency service provider to one or more devices used by emergency responders, such as, cellular phones, PDAs (Personal Digital Assistants), etc. that are connected to the emergency service provider's network.

Figure 3:
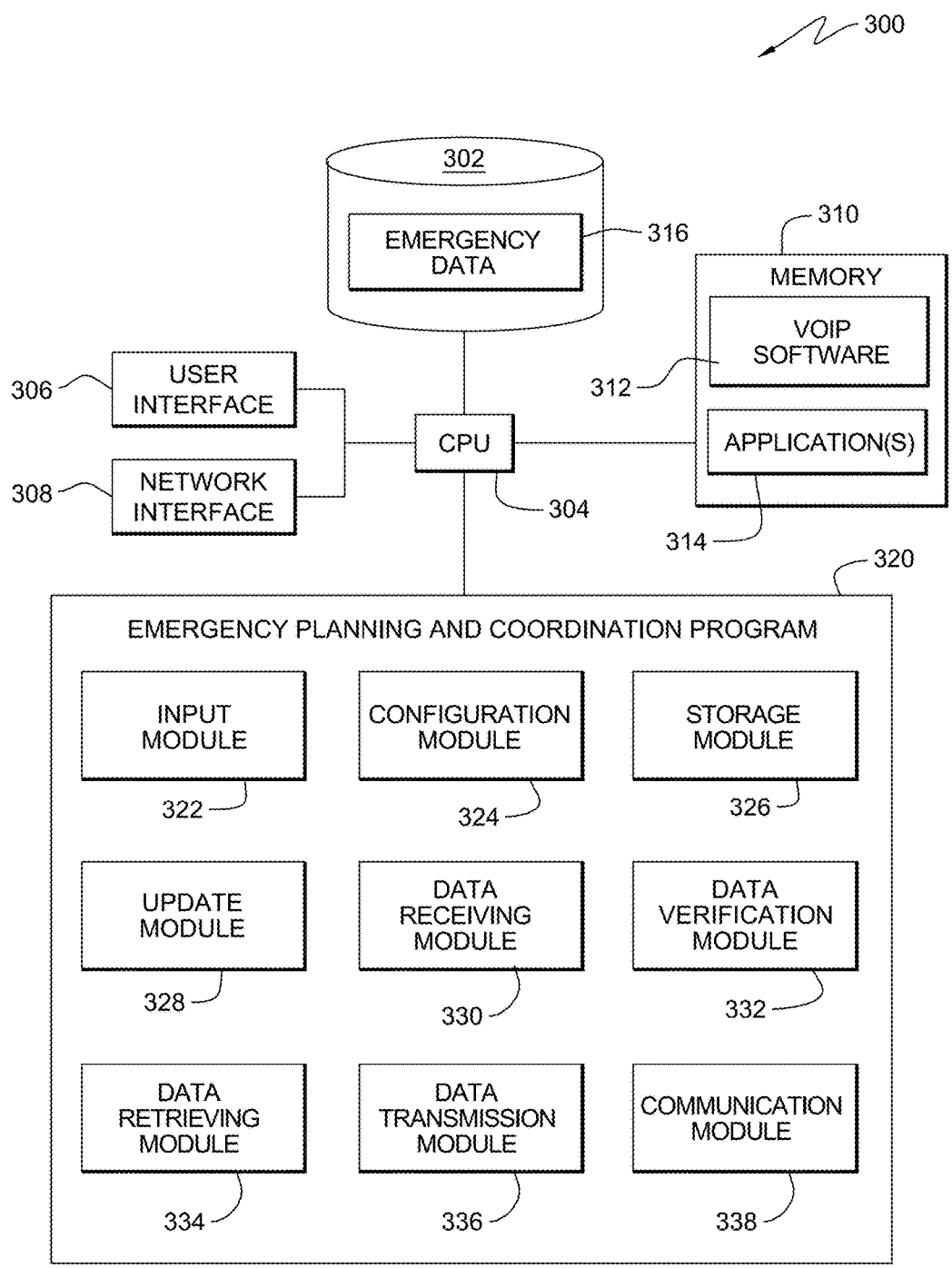
FIG. 3 depicts an embodiment of a computer system having deployed thereon an emergency planning and coordination program or tool for automating the transmission and communication of relevant information pertaining to the occurrence of an emergency, in accordance with an embodiment of the present invention.

Reference is now made to FIG. 3, reference numeral 300 which depicts an embodiment of a computer system having deployed thereon a computer program product, namely, an emergency planning and coordination program or tool for triggering the automatic transmission and communication of relevant emergency information pertaining to the occurrence of an emergency, in accordance with an embodiment of the present invention. In an embodiment, the emergency planning and coordination tool or program 320 is stored within a main memory 310 of the home or office or business computer system or server 300. Preferably, the computer system 300 is a computer system or server that includes a central processing unit (CPU) 304, a local storage device 302, a user interface 306, a network interface 308, and a memory 310. The CPU 304 is configured generally to execute operations within the system/server 300. The user interface 306, in one embodiment, is configured to allow a user or owner to interact with the computer system or server 300, including allowing input of emergency data and information from a user or owner and communicating the emergency data and/or information to relevant individuals, such as, family and friends and/or emergency service personnel or emergency responders. The network interface 308 is configured, in one embodiment, to facilitate network communications of the system or server 300 over a communications channel of an IP-enabled network, preferably, a Voice over IP (VoIP) communications network. In an embodiment, the local memory 310 is configured to store a VoIP software application 312 for facilitating network communications of the system or server 300 over a communications channel of the Voice over IP (VoIP) communications network. In addition, the memory 310 is configured to store one or more applications or programs 314, such as, word processing application(s), spreadsheet application(s), etc. Further, as shown, in an embodiment, the emergency data and information 316 inputted by an owner or user, using the emergency planning and coordination tool or program 320 installed on the computer system or server 300, is stored within a local storage system 302 coupled to the computer system or server 300. Alternatively, the emergency data and/or information 316 may be stored in memory 310 or in a separate storage within or coupled to the system or server 300.

In one embodiment, as shown in FIG. 3, the emergency planning and coordination program or tool 320 which runs on the server or system 300 comprises a logic unit that contains a plurality of modules configured to functionally execute the necessary steps of triggering the automatic transmission and communication of relevant emergency information pertaining to the occurrence of an emergency, in accordance with an embodiment of the present invention. In an embodiment, shown in FIG. 3, the emergency planning and coordination tool or program 320 includes an input module 322, a configuration module 324, a storage module 326, an update module 328, a data receiving module 330, a data verification module 332, a data retrieving module 334, a data transmission module 336 and a communication module 338. The input module 322 is configured to receive input from an owner or user for inputting emergency data and/or information into the computer system or server 300, such as, floor plans, emergency numbers, phone numbers of family and friends, e-mail or digital addresses of people to contact, etc. The configuration module 324 enables an owner or user to configure the emergency data and/or information inputted into the computer system or server 300 for facilitating distribution of the emergency data and/or information stored therein. For instance, an owner may configure the emergency planning and coordination program or tool to send certain information or data based on a type of emergency that has occurred, such as, a fire emergency or a police emergency, etc., as further discussed herein below with respect to FIG. 5. The storage module 326 is configured to store the emergency data and/or information entered or inputted into the computer system or server 300. In an embodiment, the storage module 326 stores the emergency data and/or information in a local storage, such as, storage 302 within computer system or server 300. In an embodiment, the update module 328 is configured to update any emergency data and/or information stored within the computer system or server 300. Further, the data receiving module 330 is configured to receive an emergency call made by an owner or user of the computer system or server 300 during an emergency. The data verification module 332 is configured to verify or check whether or not the emergency call made by an owner or user of the computer system or server 300 is in fact an emergency number that is part of the emergency data and/or information stored within the local storage 302. Further, the data retrieving module 334 is configured to retrieve the emergency data and/or information upon confirmation or verification that the emergency call is in fact an emergency number stored within the local storage 302 of the computer system or server 300. The data transmission module 336 is configured to transmit or send the emergency data and/or information to the parties as specified by the owner or user in the emergency data and/or information provided to the configuration module 324 of the computer system or server 300. The communication module 338 is configured to connect or establish a connection for making a call when an emergency call is received by the emergency planning and coordination program or tool 320. Further, the communication module 338 is configured to permit communication between the various modules of the emergency planning and coordination program or tool and other computer systems or servers, such as, a computer system employed by one or more emergency service providers, which is discussed further herein below with respect to FIG. 4.

Figure 4:
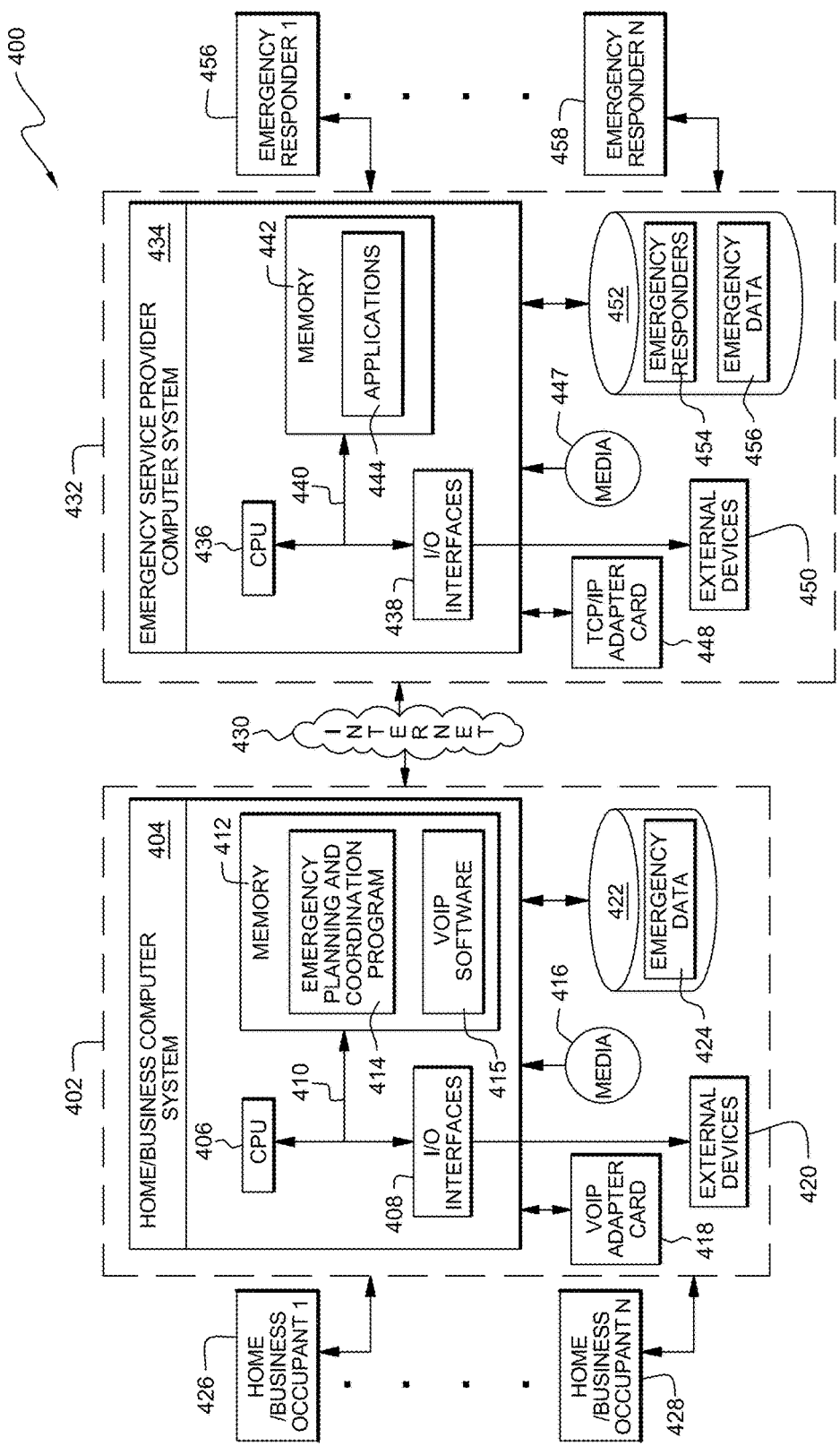
FIG. 4 depicts a computer infrastructure for automating the transmission and communication of relevant information pertaining to the occurrence of an emergency, in accordance with an embodiment of the present invention.

Reference is now made to FIG. 4, reference numeral 400, which depicts a computer infrastructure for triggering the transmission and communication of relevant information pertaining to the occurrence of an emergency, in accordance with an embodiment of the present invention. In an embodiment, the computer infrastructure 400 includes a first computer system 404, such as, a home, office or a business computer system or server, that has stored within a local memory 412, a computer program product, namely, the emergency planning and coordination program or tool 414, configured to trigger the automatic transmission and communication of emergency data and/or information to a second computer system 434, such as, a computer system or server used by an emergency service provider. Further, the computer system 404 has deployed thereon another computer program product, namely, VoIP software or application 415 that enables VoIP communications between computer system 404 and another system 434. The computer program product comprises a computer readable or computer-usable storage medium, which provides program code or instructions, such as, the emergency planning and coordination program or tool 414, for use by or in connection with a computer or any instruction execution system. The emergency planning and coordination program or tool 414 and/or the VoIP software 415 can be loaded into computer system 404 from computer readable storage media 416, such as, a magnetic tape or disk, optical media, DVD, memory stick, semiconductor memory, etc. or downloaded from the Internet via a VoIP adapter card 418. As depicted in FIG. 4, the home or office or business computer system 404 resides within computer infrastructure 402, which is intended to represent any type of computer architecture that is maintained in a secure environment (i.e., for which access control is enforced) by the owner. It should be understood, however, that although not shown, other hardware and software components (e.g., additional computer systems, routers, firewalls, etc.) could be included in infrastructure 402.

In general, a home or business occupant or owner 1 (reference numeral 426) through home or business occupant N (reference numeral 428) may access the computer system or server 404, which has deployed thereon a VoIP software 415 and the emergency planning and coordination program or tool 414, which implements the invention. The VoIP software 415 enables network communications over a Voice over IP (VoIP) communications network. For instance, a home or business occupant or owner 1 (reference numeral 426) through home or business occupant N (reference numeral 428) may access the computer server or system 404 that has installed thereon the emergency planning and coordination program 414 via a VoIP network adapter card 418 coupled to the computer system or server 404. Further, the emergency planning and coordination program or tool 414 running on the system or server 404 triggers the automatic transmission of emergency data and/or information 424 stored within a local storage 422 to another computer system 434, over a network connection, such as, the Internet 430 during an emergency.

The computer system or server 404 is shown to include a CPU (hereinafter "processing unit 406"), a memory 412, a bus 410, and input/output (I/O) interfaces 408. Further, the server 404 is shown in communication with external I/O devices/resources 420 and storage system 422. In general, processing unit 406 executes computer program code, such as the emergency planning and coordination program or tool 414. While executing computer program code, the processing unit 406 can read and/or write data to/from memory 412, storage system 422, and/or I/O interfaces 408. For instance, in one embodiment, the emergency planning and coordination program or tool 414 stores emergency data and/or information inputted by an owner in storage 422 coupled to the computer system 404. Bus 410 provides a communication link between each of the components in computer system 404, such that information can be communicated within the infrastructure 402. External devices 420 can comprise any devices (e.g., keyboard, pointing device, display, etc.) that enable a user to interact with computer system 404 and/or any devices (e.g., network card, modem, etc.) that enable system or server 404 to communicate with one or more other computing devices.

Computer infrastructure 402 is only illustrative of various types of computer infrastructures for implementing the invention. For example, in an embodiment shown, computer infrastructure 402 comprises three or more computing devices (e.g., a server cluster) that communicate over a network to perform the various process steps of the invention. Moreover, computer infrastructure 402 is only representative of various possible computer systems that can include numerous combinations of hardware. To this extent, in other embodiments, computer infrastructure 402 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 406 may comprise a single processing unit, or be distributed across one or more processing units in one or more locations, e.g., on a client and server. Similarly, memory 412 and/or storage system 422 can comprise any combination of various types of data storage that reside at one or more physical locations. Further, I/O interfaces 408 can comprise any system for exchanging information with one or more external devices 420. Still further, it is understood that one or more additional components (e.g., system software, math co-processing unit, etc.) not shown in FIG. 4 can be included in computer system 404. Storage system 422 can be any type of system (e.g., a database) capable of providing storage for information under the present invention, such as, the emergency data and/or information 424 to be retrieved from the system 404 during an emergency. To this extent, storage system 422 could include one or more storage devices, such as a magnetic disk drive or an optical disk drive. In another embodiment, storage system 422 includes data distributed across, for example, an IP-enabled network. Although not shown, additional components, such as cache memory, communication systems, system software, etc., may be incorporated into computer infrastructure 402.

In addition, as shown in FIG. 4, the emergency data and/or information 424 retrieved from the home or office computer system or server 404 during an emergency is automatically transmitted to another computer system 434, preferably, an emergency service provider computer system that resides within another infrastructure 432. In an embodiment, as shown in FIG. 4, the emergency service provider computer system or server 434 residing within infrastructure 432 has deployed thereon one or more application(s) 444. In an embodiment, as shown, the application(s) 444 are stored within local memory 442. Further, the emergency service provider computer system or server 434 is shown to include a CPU (hereinafter "processing unit 436"), a memory 442, a bus 440, and input/output (I/O) interfaces 438. Further, the emergency service provider server 434 is shown in communication with external I/O devices/resources 450 and storage system 452. In general, processing unit 436 executes computer program code, such as, the one or more application(s) 444 for distributing emergency data and/or information obtained from the home or business computer system 404 to a team of emergency responders and/or other personnel and/or people to be notified of the emergency. In an embodiment, the emergency data 456 retrieved from the home or business computer system 404 can be loaded into the emergency service provider computer system 434 from computer readable storage media 447, such as, a magnetic tape or disk, optical media, DVD, memory stick, semiconductor memory, etc. or downloaded from the Internet via a TCP/IP adapter card 448. While executing computer program code, the processing unit 436 can read and/or write data to/from memory 442, storage system 452, and/or I/O interfaces 438. Also, as shown in FIG. 4, the storage system 452 has stored thereon a list of emergency responders 454 that are available to respond to the emergency. Further, bus 440 provides a communication link between each of the components in computer system 434, such that, information can be communicated within the infrastructure 432. External devices 450 can comprise any devices (e.g., keyboard, pointing device, display, etc.) that enable an emergency service provider to interact with computer system 434 and/or any devices (e.g., network card, modem, etc.) that enable system or server 434 to communicate with one or more other computing devices.

In general, an emergency responder 1 (reference numeral 456) through emergency responder N (reference numeral 458) may access the computer system or server 434, which has deployed thereon applications 444 for facilitating or handling different emergencies. The system or server 434 facilitates distribution of the emergency data and/or information 456 obtained or retrieved from the home or business computer system 404 and stored in a storage 452 local to the emergency service provider computer server 434 to a team of emergency responders and/or other personnel to be notified of the emergency, by using a network connection, such as, the Internet.

Figure 5:
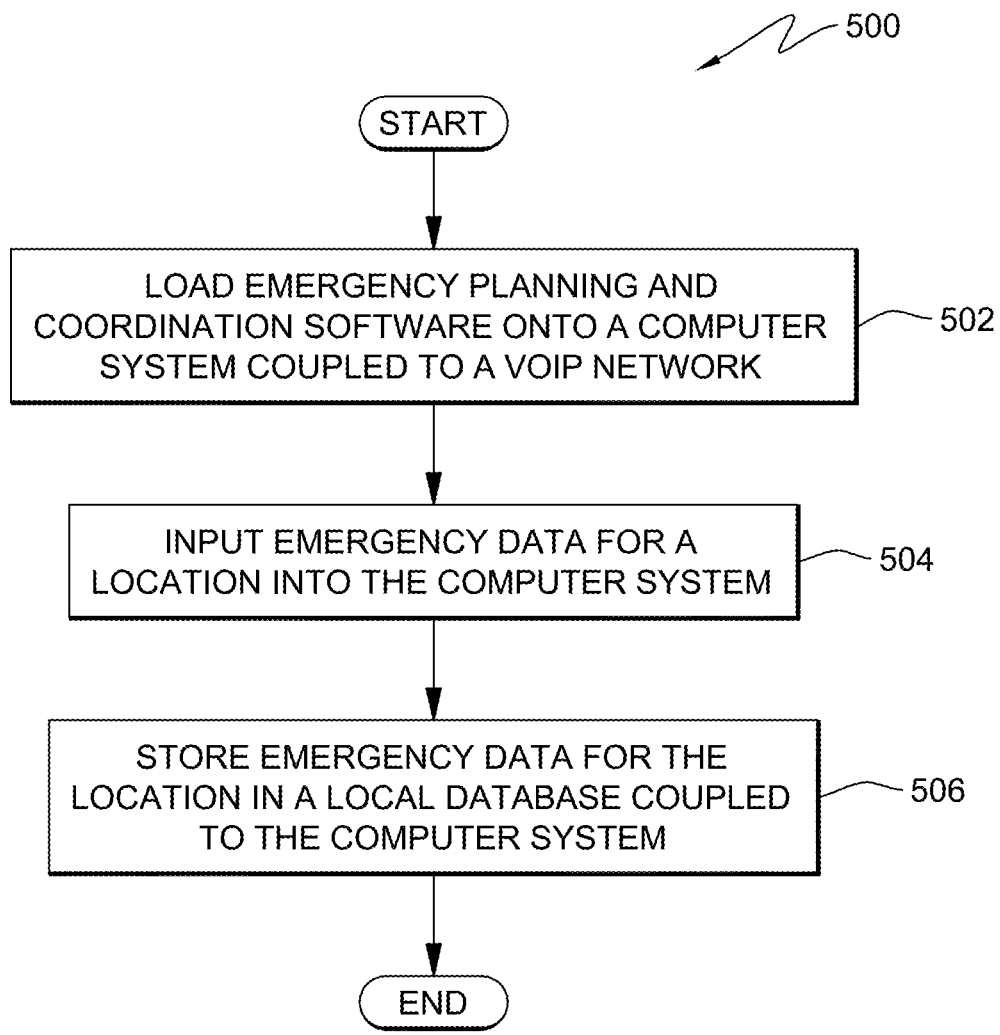
FIG. 5 depicts a flowchart outlining the initial steps performed by a user of the emergency planning and coordination program or tool for triggering the automatic transmission and communication of relevant information pertaining to the occurrence of an emergency, in accordance with an embodiment of the present invention.

In another embodiment, the invention provides a method for triggering the automatic transmission of emergency data and/or information during an emergency, in accordance with an embodiment of the present invention. Reference is now made to FIG. 5, reference numeral 500, which outlines the initial steps performed by a home owner or business owner for triggering the automatic transmission and communication of relevant emergency information during the occurrence of an emergency, in accordance with an embodiment of the present invention. In step 502, the home owner or business owner loads an emergency planning and coordination program or tool provided for triggering the automatic transmission and communication of relevant emergency information to friends, family and/or an emergency service provider during an emergency. In an embodiment, the computer system is a Voice over IP (VoIP) enabled computer system that can connect to and is configured to distribute emergency information over a Voice over IP (VoIP) communications network. Further, the home owner or business owner inputs in step 504 emergency data and/or information for the location, such that, emergency data and/or information can be automatically transmitted and communicated during an emergency. In an embodiment, the emergency data and/or information inputted by a home owner or business owner may include one or more of the following: one or more predefined emergency responder telephone numbers to be dialed in case of an occurrence of the emergency situation at the location, one or more predefined emergency responder e-mail addresses for sending electronic mail in case of an occurrence of the emergency situation at the location, one or more predefined emergency responder IP (Internet Protocol) addresses for sending electronic mail in case of an occurrence of the emergency situation at the location, a detailed floor plan of the location of the computer system, room-specific information for the location, names of each occupant residing at the location, age of each occupant residing at the location, a respective location of a room occupied by a child, a respective location of a room occupied by an elderly person, a respective location of a room occupied by a disabled person, allergy-related information for each occupant residing at the location, any medical conditions relevant to each occupant residing at the location, respective e-mail addresses of one or more persons to be contacted in case of the occurrence of the emergency situation, respective telephone numbers of one or more persons to be contacted in case of the occurrence of the emergency situation, respective e-mail addresses of one or more emergency responders to be contacted who service the location, respective locations of any flammables kept at the location, respective locations of any poisonous chemicals kept at the location and/or any other emergency-type information. Further, the home owner or business owner may configure the emergency data and/or information according to a type of emergency, such that, only a subset of the emergency data and/or information is transmitted and communicated. Finally, referring to step 506, the emergency data and/or information inputted by a home owner or business owner is stored within a local database in the computer system or coupled to the computer system, ending the process.

Figure 6:
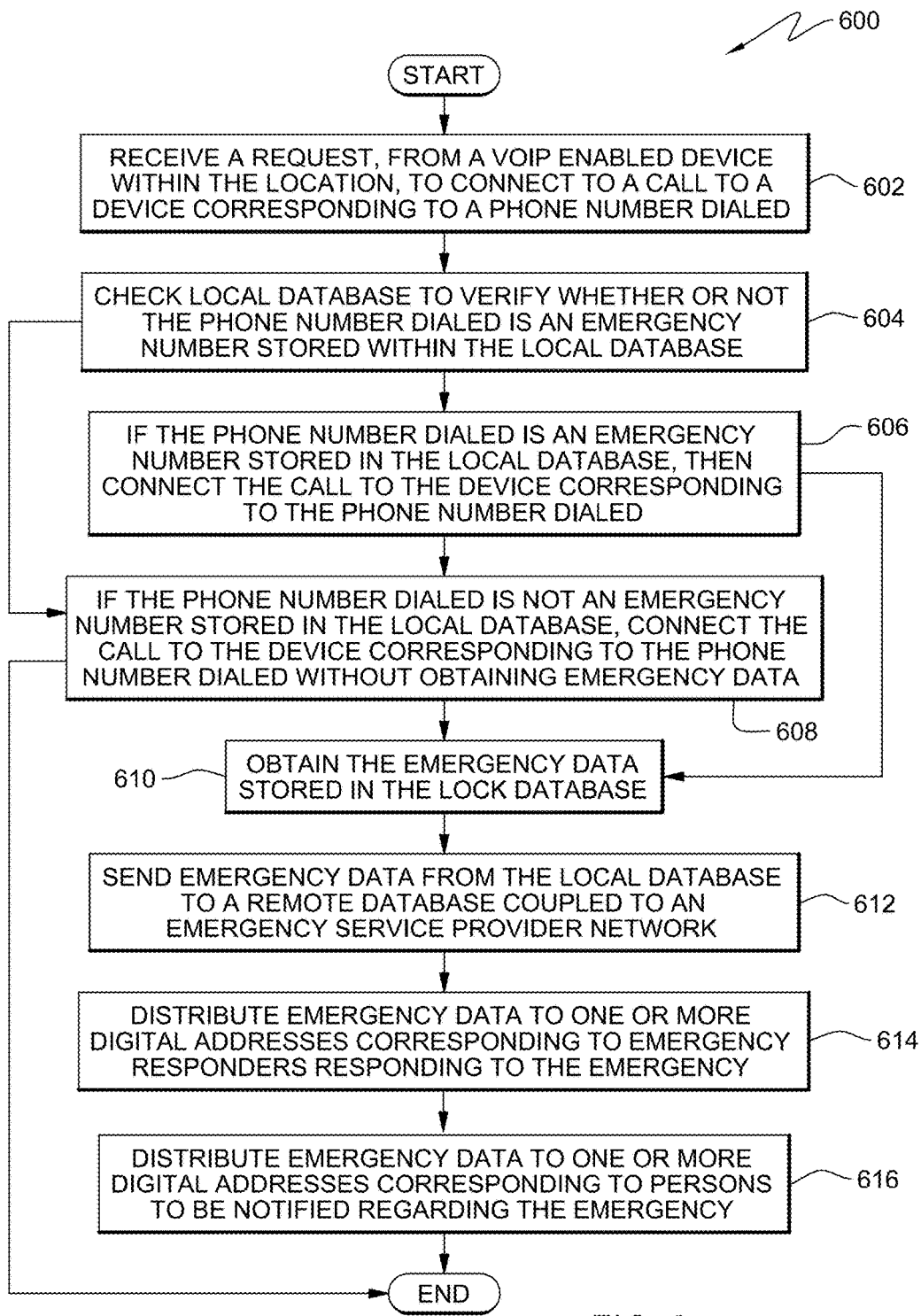
FIG. 6 depicts a flowchart outlining one embodiment of the steps performed by the emergency planning and coordination program or tool installed on a computer system for triggering the automatic transmission and communication of relevant information pertaining to the occurrence of an emergency, in accordance with an embodiment of the present invention.

Reference is now made to FIG. 6, reference numeral 600, which outlines the method steps performed by the emergency planning and coordination program or tool deployed on a home owner's or business owner's computer system, in accordance with an embodiment of the invention. Turning to FIG. 6, reference numeral 600, depicts a flowchart outlining one embodiment of the steps performed by the emergency planning and coordination program or tool installed on a home or business computer system for triggering, transmitting and communicating relevant information pertaining to the occurrence of an emergency, in accordance with respective embodiments of the present invention. In particular, reference numeral 600 outlines the method steps performed by the emergency planning and coordination program or tool deployed on a home owner's or business owner's computer system when the trigger is received from within the location itself, as described herein above with respect to FIG. 1. During the emergency, the home owner or business owner dials an emergency number, using a VoIP phone or a regular phone connected to a VoIP adapter. The emergency planning and coordination program or tool loaded on the home or business computer system, receives in step 602 the request to connect a call, as dialed, to a device corresponding to the phone number dialed. The emergency planning and coordination program or tool checks in step 604 the local database or storage connected to the home or business computer system to determine whether or not the phone number dialed is an emergency number stored within the local storage or database. If the emergency planning and coordination program or tool determines in step 606 that the phone number dialed is an emergency number stored in the local storage or database, then the emergency planning and coordination program or tool connects in step 608 the call to a respective device corresponding to the phone number dialed and in step 610, the emergency planning and coordination program or tool obtains the emergency data and/or information stored in the local storage or database. Further, the emergency planning and coordination program or tool sends or transmits in step 612 the emergency data and/or information retrieved from the local database or storage to a remote database or storage coupled to an emergency service provider network. Furthermore, in step 614, the emergency planning and coordination program or tool distributes the emergency data and/or information obtained or retrieved using one or more digital or electronic addresses corresponding to devices of one or more emergency responders responding to the emergency. Moreover, in step 616, the emergency planning and coordination program or tool distributes the emergency data and/or information obtained or retrieved using one or more digital or electronic addresses corresponding to devices of persons (family, friends and/or neighbors, etc.) to be notified regarding the emergency. Going back to step 606, if the emergency planning and coordination program or tool determines that the phone number dialed is not an emergency number stored in the local storage or database, then the emergency planning and coordination program or tool connects the call to a respective device corresponding to the phone number dialed without obtaining emergency data and/or information from the computer system, ending the process.

Figure 7:
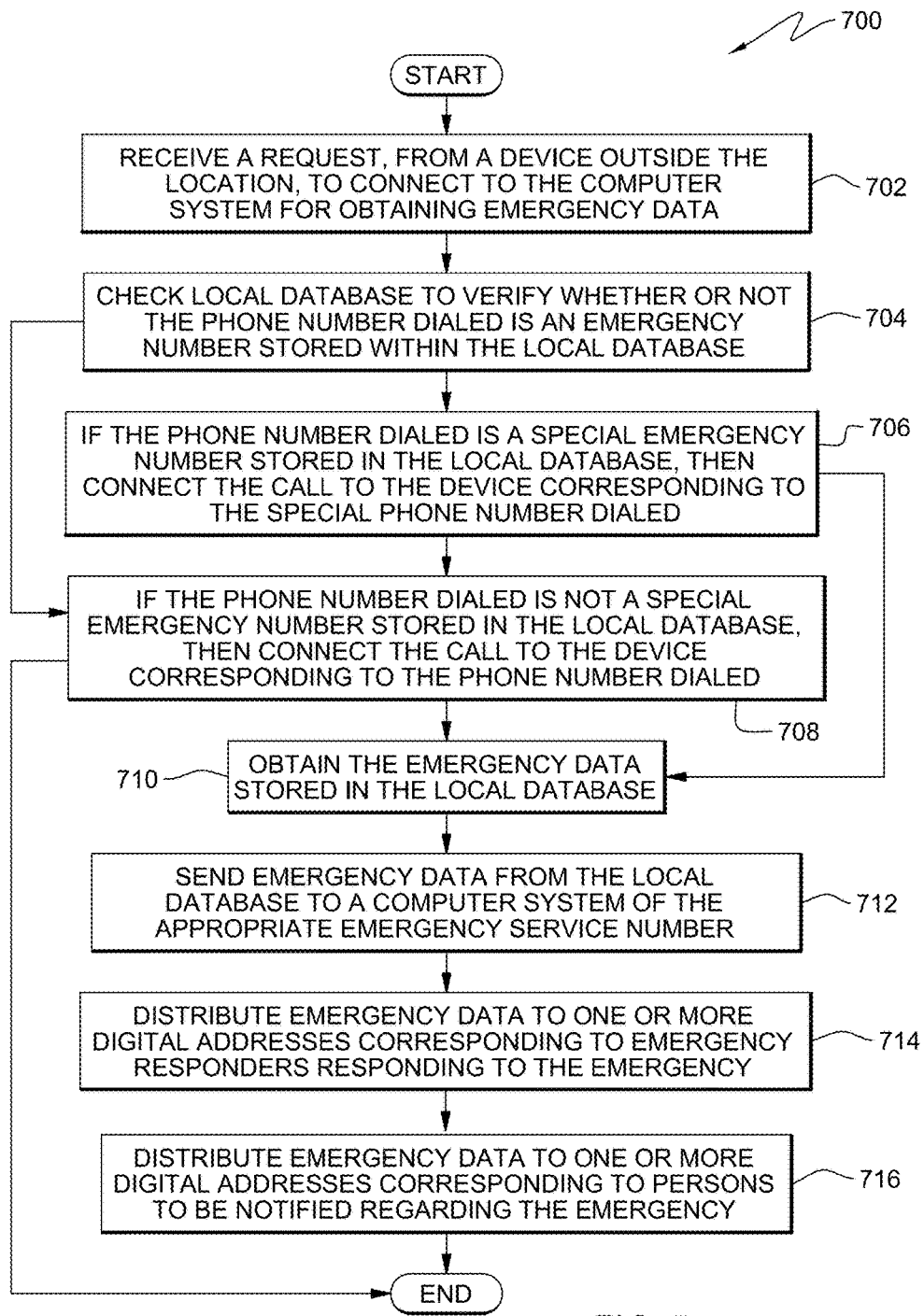
FIG. 7 depicts a flowchart outlining another embodiment of the steps performed by the emergency planning and coordination program or tool installed on a computer system for triggering the automatic transmission and communication of relevant information pertaining to the occurrence of an emergency, in accordance with an embodiment of the present invention.

Turning to FIG. 7, reference numeral 700 outlines the method steps performed by the emergency planning and coordination program or tool deployed on a home owner's or business owner's computer system when the trigger is received from outside the location of the emergency, as described herein above with respect to FIG. 2. Turning to FIG. 7, reference numeral 700, depicts a flowchart outlining one embodiment of the steps performed by the emergency planning and coordination program or tool installed on a home or business computer system for triggering, transmitting and communicating relevant information pertaining to the occurrence of an emergency, in accordance with respective embodiments of the present invention. During the emergency, the home owner or business owner leaves the house or place of business and dials a special emergency number from outside the location of the emergency to connect to the home or business computer system network, using either a cell phone or a neighbor's phone, etc. The home owner dials the special emergency number and the call is routed via the VoIP adapter connected to the home computer system connected to the VoIP network. The VoIP software or program receives in step 702 the request to connect to the home or business computer system for obtaining emergency data and/or information. The emergency planning and coordination program or tool loaded on the computer system checks in step 704 the local database or storage connected to the home or business computer system to determine whether or not the special phone number dialed is a special emergency number stored within the local storage or database. If the emergency planning and coordination program or tool determines in step 706 that the special phone number dialed is an emergency number stored in the local storage or database, then the emergency planning and coordination program or tool connects in step 708 the call to a respective device corresponding to the special phone number dialed and, in step 710, the emergency planning and coordination program or tool obtains the emergency data and/or information stored in the local storage or database. Further, the emergency planning and coordination program or tool automatically sends or transmits in step 712 the emergency data and/or information retrieved from the local database or storage to a computer system corresponding to the emergency service number dialed. Furthermore, in step 714, the emergency planning and coordination program or tool distributes the emergency data and/or information obtained or retrieved using one or more digital or electronic addresses corresponding to devices of one or more emergency responders responding to the emergency. Moreover, in step 716, the emergency planning and coordination program or tool distributes the emergency data and/or information obtained or retrieved using one or more digital or electronic addresses corresponding to devices of persons (family, friends and/or neighbors, etc.) to be notified regarding the emergency. Going back to step 706, if the emergency planning and coordination program or tool determines that the phone number dialed is not an emergency number stored in the local storage or database, then the emergency planning and coordination program or tool connects the call to a respective device corresponding to the phone number dialed without obtaining emergency data and/or information from the computer system, ending the process.

Accordingly, the invention provides transmission of the relevant emergency data and/or information to emergency personnel at the time of the emergency, such that, the information is quickly available and can be used by the emergency personnel responding to the home or business emergency. Further, the emergency planning and coordination program or tool enables the prompt dissemination or communication of the occurrence of the emergency to family members and friends.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method, said method comprising:
monitoring, by one or more processors of a first computer located in a building, outgoing calls from a telephone in the building, said monitoring identifying an outgoing call dialed from the telephone;
determining, by the one or more processors, that the identified outgoing call is a telephone number of an emergency response center; and
in response to said determining that the outgoing call is the telephone number of the emergency response center, transmitting, by the one or more processors via a communications network, emergency data having relevance to an emergency at the building to a second computer of the emergency response center and to a plurality of emergency responders available to respond to the emergency at the building, wherein the emergency responders are associated with the emergency response center, and wherein the emergency data transmitted to each emergency responder is specific to each emergency responder.

2. The method of claim 1, said method comprising:
in further response to said determining that the outgoing call is the telephone number of the emergency response center, transmitting, by the one or more processors via the communications network, an electronic diagram of an interior of the building to the second computer to enable the emergency response center to access the electronic diagram to facilitate handling of the emergency at the building.

3. The method of claim 1, said method comprising:
prior to the emergency, receiving, by the one or more processors from a user of the telephone, a registration of the telephone number of the emergency response center and storing, by the one or more processors, the received telephone number of the emergency response center in a database in the building.

4. The method of claim 3, wherein the database is not accessible to the second computer.

5. The method of claim 1, wherein the telephone uses Voice over IP (VoIP) communication to make the outgoing call to the emergency response center and other outgoing calls to other telephones not associated with the emergency response center, and wherein the first computer monitors the VOIP telephone calls made from the telephone in the building to the emergency response center and other outgoing calls made from the telephone in the building to other telephones not associated with the emergency response center.

6. The method of claim 1, wherein the electronic diagram is a floor plan of the building.

7. A computer program product, comprising one or more computer readable hardware storage devices having computer readable program code stored therein, said program code containing instructions executable, by one or more processors of a first computer located in a building, to implement a method, said method comprising:
monitoring, by the one or more processors, outgoing calls from a telephone in the building, said monitoring identifying an outgoing call dialed from the telephone;
determining, by the one or more processors, that the identified outgoing call is a telephone number of an emergency response center; and
in response to said determining that the outgoing call is the telephone number of the emergency response center, transmitting, by the one or more processors via a communications network, emergency data having relevance to an emergency at the building to a second computer of the emergency response center and to a plurality of emergency responders available to respond to the emergency at the building, wherein the emergency responders are associated with the emergency response center, and wherein the emergency data transmitted to each emergency responder is specific to each emergency responder.

8. The computer program product of claim 7, said method comprising:
in further response to said determining that the outgoing call is the telephone number of the emergency response center, transmitting, by the one or more processors via the communications network, an electronic diagram of an interior of the building to the second computer to enable the emergency response center to access the electronic diagram to facilitate handling of the emergency at the building.

9. The computer program product of claim 7, said method comprising:
prior to the emergency, receiving, by the one or more processors from a user of the telephone, a registration of the telephone number of the emergency response center and storing, by the one or more processors, the received telephone number of the emergency response center in a database in the building.

10. The computer program product of claim 9, wherein the database is not accessible to the second computer.

11. The computer program product of claim 7, wherein the telephone uses Voice over IP (VoIP) communication to make the outgoing call to the emergency response center and other outgoing calls to other telephones not associated with the emergency response center, and wherein the first computer monitors the VOIP telephone calls made from the telephone in the building to the emergency response center and other outgoing calls made from the telephone in the building to other telephones not associated with the emergency response center.

12. The computer program product of claim 7, wherein the electronic diagram is a floor plan of the building.

13. A computer system, comprising a first computer, said first computer comprising one or more processors, one or more memories, and one or more computer readable hardware storage devices, said one or more hardware storage device containing program instructions executable by the one or more processors via the one or more memories to implement a method, said method comprising:
monitoring, by the one or more processors, outgoing calls from a telephone in the building, said monitoring identifying an outgoing call dialed from the telephone;
determining, by the one or more processors, that the identified outgoing call is a telephone number of an emergency response center; and
in response to said determining that the outgoing call is the telephone number of the emergency response center, transmitting, by the one or more processors via a communications network, emergency data having relevance to an emergency at the building to a second computer of the emergency response center and to a plurality of emergency responders available to respond to the emergency at the building, wherein the emergency responders are associated with the emergency response center, and wherein the emergency data transmitted to each emergency responder is specific to each emergency responder.

14. The computer system of claim 13, said method comprising:
in further response to said determining that the outgoing call is the telephone number of the emergency response center, transmitting, by the one or more processors via the communications network, an electronic diagram of an interior of the building to the second computer to enable the emergency response center to access the electronic diagram to facilitate handling of the emergency at the building.

15. The computer system of claim 13, said method comprising:
prior to the emergency, receiving, by the one or more processors from a user of the telephone, a registration of the telephone number of the emergency response center and storing, by the one or more processors, the received telephone number of the emergency response center in a database in the building.

16. The computer system of claim 15, wherein the database is not accessible to the second computer.

17. The computer system of claim 13, wherein the telephone uses Voice over IP (VoIP) communication to make the outgoing call to the emergency response center and other outgoing calls to other telephones not associated with the emergency response center, and wherein the first computer monitors the VOIP telephone calls made from the telephone in the building to the emergency response center and other outgoing calls made from the telephone in the building to other telephones not associated with the emergency response center.

18. The computer system of claim 13, wherein the electronic diagram is a floor plan of the building.

* * * * *